Figure 1:
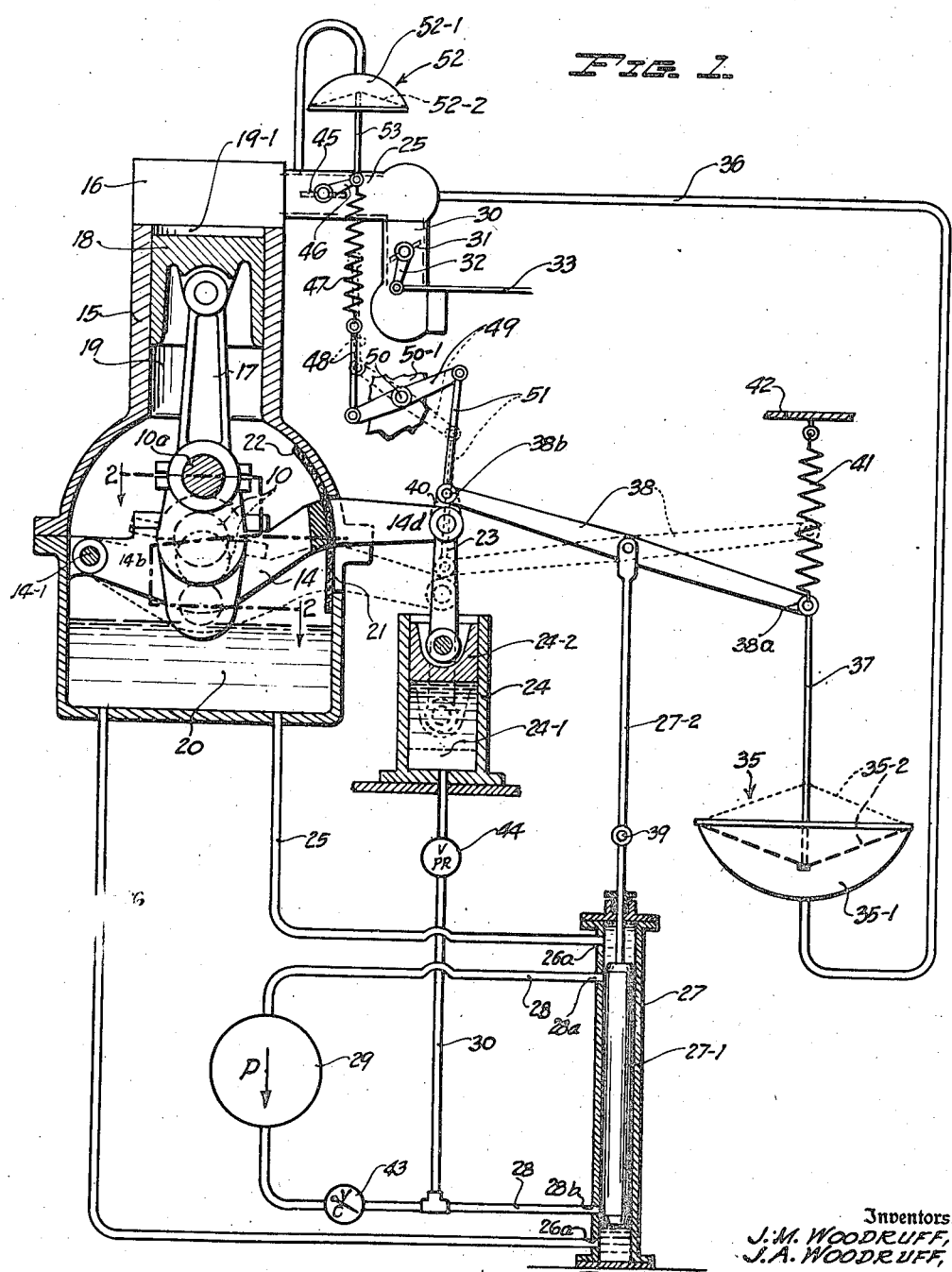

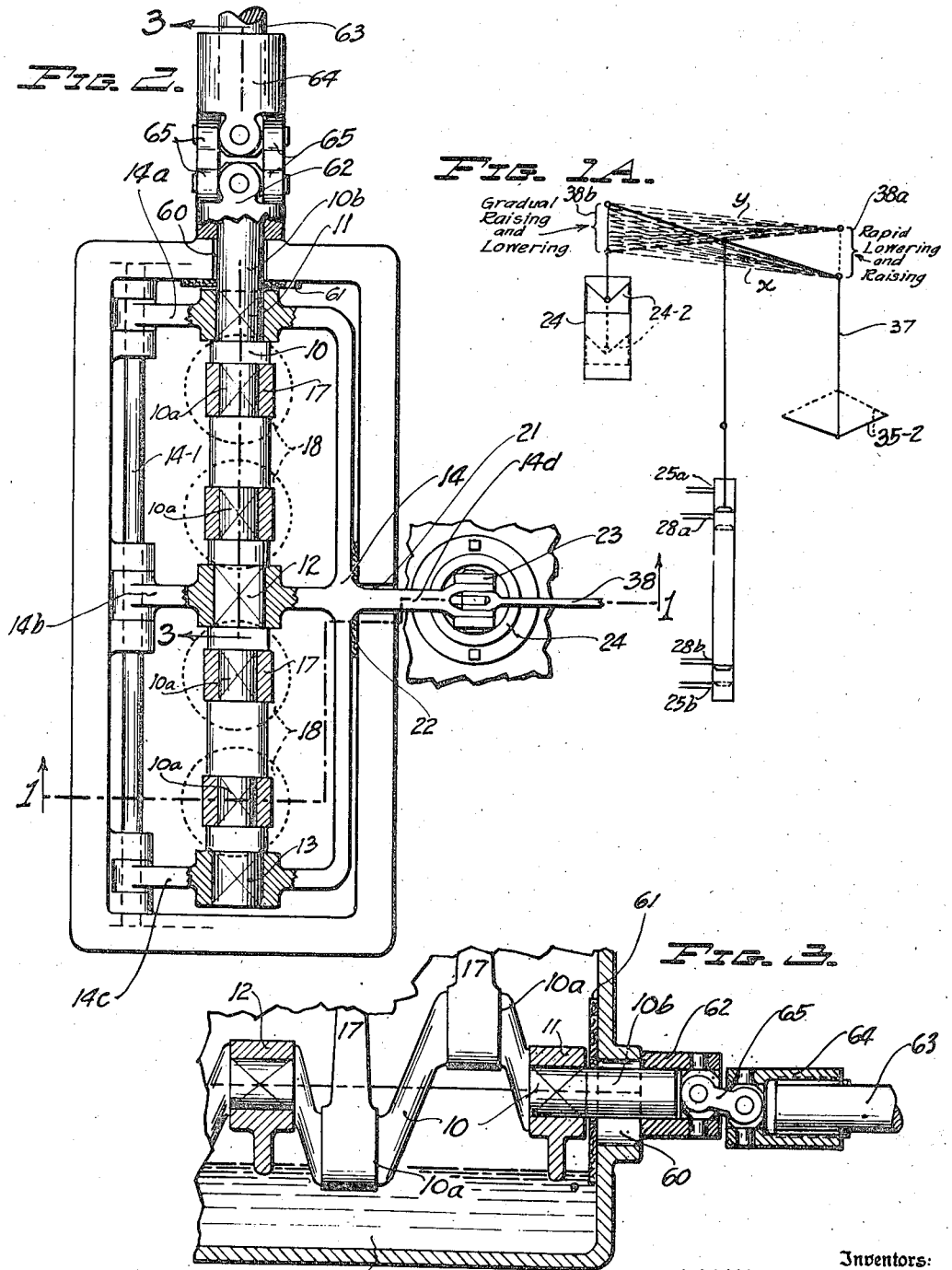

Patented Dec. 30, 1947

2,433,639

UNITED STATES PATENT OFFICE 2,433,639

ADJUSTABLE COMBUSTION CHAMBER FOR INTERNAL-COMBUSTION ENGINES

John Melvin Woodruff and Jesse Alvin Woodruff, Tremonton, Utah

Application September 24, 1942, Serial No. 459,484

7 Claims. (Cl. 123—48)

This invention relates to adjustable combustion chamber for internal combustion engines wherein the design ratio of compression is kept substantially constant during varying conditions of engine operation.

The invention particularly relates to control systems for automatically varying the volumetric ratio of compression in accordance with engine requirements, that is, for automatically varying the sizes of the respective enclosed cylinder spaces of an internal combustion engine within which the explosive or ignitable charges are compressed and ignited.

Conventional internal combustion engines having fixed operative relationship between pistons and cylinders, cannot maintain the design ratio of compression constant during operation. The result is waste of fuel and inefficiency of operation in general.

The waste and inefficiency are caused by the fact that, with the spaces between the working faces of the pistons and the cylinder heads, i. e. the compression chambers of the cylinders, positively predetermined in size characteristics, as they are where pistons and cylinders have fixed operative relationships, the suction effective therein when the engine is idling or running at low speeds with the accelerator or throttle only partially open, cannot be completely satisfied by the limited fuel and air intake, and partial vacuums are formed within such compression chambers prior to the compressing strokes of the pistons. Accordingly, what limited quantities of fuel and air that are drawn into the compression chambers on the intake stroke of the pistons are only partially compressed on the compressing strokes of the pistons, and efficiency of operation is cut down to that extent.

Internal combustion engines have heretofore been designed with extensible pistons or with crank shafts capable of being elevated relative to the cylinder block for varying the sizes of the respective cylinder compression chambers, thus overcoming this difficulty of inadequate compression under certain conditions of operation, but, so far as we are aware, controls for these variable arrangements have been inadequate, and for the most part, impractical.

Accordingly, among the objects of the invention the following are outstanding:

*First.*—To provide an internal combustion engine arranged to operate on a design compression ratio which is automatically maintained substantially uniform throughout any given period of operation of the engine, to insure maximum combustion at all times and to prevent firing at low compression.

*Second.*—To provide the above at comparatively low cost and with a minimum of change in conventional internal combustion engine design.

*Third.*—To provide for elevating and lowering the crankshaft of an internal combustion engine relative to the cylinder block thereof under positive control originating in the intake manifold of the engine, thus varying the sizes of the respective cylinder compression chambers in strict accordance with operating requirements.

*Fourth.*—To provide hydraulic means for elevating the crankshaft of the engine in response to the desired control.

*Fifth.*—To take off from the lubricating system of the engine the necessary hydraulic fluid for the hydraulic lifting means, and to return such hydraulic fluid back to the lubricating system after it has accomplished its purpose.

*Sixth.*—To automatically insure against the intake of too much fuel mixture by the respective cylinders at such times as the crankshaft is being lowered and the cylinder compression chambers are thereby being increased in size.

Further objects and features of the invention will be apparent from the following description of the preferred embodiment illustrated in the accompanying drawings.

In the drawings:

Fig. 1 represents a vertical sectional view, taken on the line 1—1, Fig. 2, of a gasoline internal combustion engine equipped with a preferred embodiment of the control system of the invention, the illustration being largely diagrammatic;

Fig. 1A, an operation diagram;

Fig. 2, a horizontal section taken on the line 2—2, Fig. 1, the several control instrumentalities illustrated in Fig. 1 being not here shown; and Fig. 3, an enlarged fragmentary vertical section taken on the line 3—3, Fig. 2, illustrating the flexible connection of the crankshaft with a stationary driven shaft.

The control system of the invention may be utilized in combination with a variety of different types of internal combustion engines, but is here exemplified in association with an engine having four vertical cylinders aligned in what is known as "straight" formation, see Fig. 2.

The only departure from conventional design in the engine proper resides in the arrangement of the crankshaft. Fuel intake, ignition, exhaust, valve operation, and timing are all provided for according to well known practice, and are, therefore, not here illustrated or described.

In the preferred embodiment of the invention here illustrated, the control apparatus is suitably connected to the intake manifold, to the crankshaft, and to the crankcase of the engine for accomplishing, automatically, the desired control of compression in accordance with operating requirements.

The crankshaft 10 is journaled at 11, 12 and 13 in the respective arms 14a, 14b and 14c of a cradle 14, Fig. 2, which is pivoted, at the free ends of its respective arms, on a shaft 14—1, for controlled upward and downward rocking movement relative to the cylinder block 15 and cylinder head 16, see Fig. 1, during operation of the engine.

Connected to the four cranks 10a of the crankshaft 10 by means of respective conventional connecting rods 17 are respective pistons 18, arranged to reciprocate within the respective cylinders 19 of the cylinder block 15.

The pivotal mounting of the cradle 14 enables the crankshaft 10 to be rocked up and down, and, thus, the pistons 18 to be adjusted relative to cylinder head 16, as occasion might require.

Extending outwardly from the crankcase 20 through an aperture 21 formed partly in a wall of the crankcase and partly in a corresponding wall of the cylinder block 15, is a centrally located, actuating arm 14d of the cradle 14. A flexible cover 22 made of oil-proof flexible material, tightly closes the aperture 21, and enables cradle-actuating arm 14d to work up and down without any accompanying escape, through the aperture, of lubricating oil from the crankcase.

Linked to the outer extremity of cradle-actuating arm 14d, by means of a pivotally secured connecting link 23, is a hydraulic jack 24, the plunger of which is arranged to be elevated and lowered under control from the intake manifold 25 of the engine.

It is advantageous and convenient that the lubricating system of the engine be called upon to supply the hydraulic fluid for elevating the jack 24, although such hydraulic fluid may be supplied from a specially provided storage tank.

To this end, supply and return pipes 25 and 26, respectively, are provided, leading from communication with the crankcase 20 to communication with opposite ends of a plunger-type control valve 27 through ports 25a and 26a, respectively.

Crankcase oil is thereby supplied from and returned to the crankcase.

A closed piping or conduit circuit 28 communicates, through supply and return ports 28a and 28b, respectively, with control valve 27 at spaced upper and lower locations thereof, respectively, and intermediate the supply and return ports 25a and 26a, respectively. An oil pump 29 is connected into the piping circuit 28 for inducing circulation, and a shunt pipe 30 connects piping circuit 28 with the lifting chamber 24—1 of hydraulic jack 24.

The plunger 27—1 of control valve 27 is normally held in neutral position closing both the upper and lower ports 28a and 28b, so there is no flow of oil from the crankcase through the piping system.

When, however, the plunger 27—1 is lowered, uncovering supply port 28a and covering return port 28b, oil from crankcase 20 is caused by oil pump 29 to flow through supply pipe 25, through the upper part of control valve 27, through the portion of piping circuit 28 which leads to shunt pipe 30, and, finally, through shunt pipe 30 into lifting chamber 24—1 of hydraulic jack 24, thereby raising plunger 24—2 of the jack, and, therewith, crankshaft 10 through the intermediacy of cradle 14.

When plunger 27—1 of the control valve 27 is raised, closing supply port 28a and leaving return port 28b uncovered, oil from lifting chamber 24—1 of the jack is forced out by the weight bearing down upon plunger 24—2, and flows through shunt pipe 30, through the portion of piping circuit 28 which leads to the lower part of control valve 27, through the lower part of control valve 27, and finally, through return pipe 26 back into crankcase 20.

As aforestated, control of the operation of hydraulic jack 24 is accomplished automatically in accordance with varying conditions existing in the intake manifold 25, from time to time during operation of the engine.

The carburetor is indicated diagrammatically at 30. It may be of any usual and standard make for controlling the mixture of gasoline and air to be supplied as fuel to the several cylinders of the engine. The butterfly throttle valve 31 thereof is connected in the usual manner, as by an arm 32 and rod 33, to an accelerator or fuel-feed pedal or lever (not shown), the latter being manually actuated during operation of the engine to increase and decrease the degree of opening of the butterfly throttle valve, and, thus, to correspondingly increase and decrease the supply of fuel to, and, therefore, the speed of, the engine.

The control desired and attained by the invention depends upon the quantity of fuel (here intermixed air and gasoline from carburetor 30) supplied through intake manifold 25 to the compression chambers 19—1 of the several cylinders 19, respectively, of the engine from time to time during operation thereof; and the quantity of fuel so supplied depends upon the extent or degree of opening of butterfly throttle valve 31. Since the operative stroke of each piston 18 is predetermined and constant, as is the case with pistons of practically all internal combustion engines of conventional design, the suction-effect is constant regardless of the extent or degree of opening of butterfly throttle valve 31, with the result that for small degrees of opening of the butterfly valve, only a small proportion of fuel can be drawn into the respective compression chambers 19—1 on the intake strokes of the respective pistons 18. The excess suction-effect can only produce a partial vacuum in the intake manifold 25, with resulting partial vacuums in the respective compression chambers 19—1.

It is because these partial vacuums in the respective compression chambers 19—1 prevent proper compression of the fuel mixtures on the compression strokes of the respective pistons 18, that raising of the crankshaft, bodily, becomes important for the purpose of compensating for, that is, for the purpose of forcing the several pistons 18 to displace, in each instance, that portion of the space between the working face or top surface of the piston and the undersurface of the corresponding cylinder head, which is represented by a vacuum condition.

In utilizing the various partial vacuum conditions in the intake manifold 25 as the control determinant, a vacuum-responsive device 35, having the suction chamber 35—1 and diaphragm 35—2, has its suction chamber communicating with the intake manifold, as by means of the pipe 36. The diaphragm 35—2 has a rigid stem 37 extending therefrom into pivotal connection with one end 38a of a floating rocker-arm 38.

The rocker-arm 38 is fulcrumed intermediate its length and preferably centrally thereof, by pivotal connection with the free end of plunger rod 27—2 of control valve 27, such plunger rod 27—2 being jointed, as at 39, intermediate its length, to prevent binding of valve plunger 27—1 within its casing during operation of the control valve.

The other end, 38b, of rocker-arm 38 is pivotally connected to the link 40, which is, in turn, pivotally connected to the outer extremity of cradle-actuating-arm 14d and to the connecting link 23.

A return spring 41, anchored at one of its ends to a rigid and stationary frame member 42 of the engine, has its other end secured to that end 38a of rocker-arm 38 at which the stem 37 of vacuum-responsive device 35 is connected.

The spring 41 serves to normally maintain the end 38a of rocker-arm 38 in elevated position (see dotted line position Fig. 1). By "normally" is meant during such times as no suction effect is operative in suction chamber 35—1 of vacuum-responsive device 35, and this is so both when the engine is not operating and when it is operating with throttle wide open. During such times, diaphragm 35—2 is also held in raised position, as indicated by dotted lines in Fig. 1, valve plunger 27—1 being in its aforementioned neutral position, and jack plunger 24—2, cradle 14, and crankshaft 10 being in their completely lowered positions, as are also indicated by dotted lines in Fig. 1.

When, however, a partial vacuum exists in intake manifold 25, due to butterfly throttle valve 31 being only slightly open, as for instance, when the engine is idling or running at low speed, it is manifested in like degree within suction chamber 35—1 of vacuum-responsive device 35, causing diaphragm 35—2 thereof to lower, under the influence of atmospheric pressure, against the restraining action of return spring 41. Coincidentally, end 38a of rocker-arm 38 is lowered and valve plunger 27—1 thereby lowered to uncover supply port 28a, whereby lubricating oil from crankcase 20 is allowed to flow through valve 27 into piping circuit 28 and through shunt pipe 30 into the lifting chamber 24—1 of hydraulic jack 24. The plunger 24—2 of the hydraulic jack is forced up, thereby raising cradle 14 about the shaft 14—1 as a center. Thus, crankshaft 10 is raised proportionally to the extent or degree of partial vacuum in intake manifold 25, and compensates for such vacuum condition by reducing the sizes of the respective cylinder compression chambers 19—1. Fig. 11 illustrates this completely raised position, with the particular piston 18, there appearing, disposed at the end of its compression stroke, the compression chamber 19—1 being of reduced size, compensating for the vacuum condition.

It should be noted that the pump 29 operates continually during operation of the engine, and that a check valve 43 prevents back-flow of oil from hydraulic jack 24 into the pump during the lowering of plunger 24—2 of the jack.

The raising of jack plunger 24—2 not only raises cradle 14 and crankshaft 10, but also raises end 38b of floating rocker-arm 38. End 38a is anchored and acts as a fulcrum during the raising movement, because the suction effect in chamber 35—1 of the vacuum-responsive device prevents upward movement of diaphragm 35—2 and of stem 37. Accordingly, as jack plunger 24—2 gradually rises, it pulls valve plunger 27—1 upwardly, because of its connection with rocker-arm 38, and closes supply port 28a of piping circuit 28, as illustrated in Fig. 1, thereby preventing further flow of oil to lifting chamber 24—1 of hydraulic jack 24.

It should be noted that valve plunger 27—1 is preferably of such length that, in this neutral position, it just closes both supply port 28a and return port 28b of piping circuit 28. Thus, no additional oil can be supplied to hydraulic jack 24, and what oil was supplied thereto for lifting purposes, is entrapped against return, maintaining plunger 24—2 thereof in its elevated position.

A cut-out pressure valve 44 may be provided in shunt pipe 30, for the sake of safety in case the control valve 27 fails to operate as scheduled.

So long as there is a partial vacuum in intake manifold 25, the plunger of hydraulic jack 24 will remain in elevated position, but when there is substantially no vacuum in intake manifold 25, as for instance when the butterfly throttle valve 31 is fully open and the engine is operating under load, there is no suction effect within suction chamber 35—1 of vacuum-responsive device 35, and the action of spring 41 returns diaphragm 35—2, its stem 37, and the end 38a of rocker-arm 38 to normal position, thereby opening return port 28b of piping circuit 28 and allowing the weight of cradle 14 and crankshaft 10 on hydraulic jack 24 to force the jack plunger 24—2 downwardly and return the oil in the jack lifting chamber 24—1 to crankcase 20. As jack plunger 24—2 reaches its completely lowered position, valve plunger 27—1 will be lowered just enough to place it in its neutral position closing return port 28b, this action taking place because end 38a of rocker-arm 38 is anchored in its raised position by spring 41, while end 38b of the rocker-arm lowers gradually with the outflow of oil from chamber 24—1 of the hydraulic jack.

Recapitulating: the jack plunger 24—2 of hydraulic jack 24, the cradle 14, and the crankshaft 10 are all in the completely lowered positions shown by dotted lines in Fig. 1, when the engine is not operating. The illustrated neutral position of valve plunger 27—1 is the position it assumes both when the engine is not operating (rocker-arm 38 being in its dotted line position) and when the engine is idling or operating at very low speed (rocker-arm 38 being in its full line position).

In passing from its dotted line position to its full line position, rocker-arm 38 lowers valve plunger 27—1 sufficiently to completely open the upper end of piping circuit 28, that is, the supply port 28a, thereby bringing about a supply flow of oil from crankcase 20 into lifting chamber 24—1 of the jack to elevate the jack plunger 24—2.

In passing from its full line position to its dotted line position, rocker-arm 38 raises valve plunger 27—1 sufficiently to completely open the lower end of piping circuit 28, that is, the return port 28b, thereby bringing about a return flow of oil from lifting chamber 24—1 of the jack into crankcase 20 to permit jack plunger 24—2 to lower.

Partial movement of rocker-arm 38 from its dotted line position toward its full line position opens supply port 28a proportionally. Similarly, partial movement of rocker-arm 38 from its full line position toward its dotted line position opens return port 28b proportionally.

The diagram of Fig. 1A graphically portrays the operation of the control system, as thus far described. When the engine idles after being started, the partial vacuum in intake manifold 25 creates a suction effect in suction chamber 35—1 of vacuum-responsive device 35, which is operative to rigidly lower, against the tension of spring 41, that end 38a of rocker-arm 38 to which stem 37 is attached, bringing it down to correspond with the lowered position of its opposite end 38b. This lowers valve plunger 27—1, and, thereby, opens supply port 28a. Accordingly, oil flows into the hydraulic jack 24, and raises jack plunger 27—1 gradually. Thus, that end 38b of rocker-arm 38 to which the jack plunger is connected, also raises gradually, as indicated by the successive dotted line positions of rocker-arm 38 extending from the lowermost dotted line, indicated x, upwardly, the movement being fanwise from the anchored end 38a. By the time jack plunger 24—2 and the rocker-arm end 38b reach their uppermost positions, valve plunger 27—1 will have been raised just enough to replace it in its neutral position closing both supply port 28a and return port 28b.

When the engine is given full throttle or dies for any reason, there is no longer any vacuum condition in intake manifold 25 to maintain end 38a of rocker-arm 38 in lowered position against the restraining action of spring 41. Accordingly, spring 41 rapidly raises rocker-arm end 38a, placing the rocker-arm in the dotted line position indicated y, momentarily, and raising valve plunger 27—1 to open return port 28b of piping circuit 28. The oil within lifting chamber 24—1 of the hydraulic jack flows back into crankcase 20 gradually, and jack plunger 24—2 and rocker-arm end 38b thus lower gradually, as indicated by the successive dotted line positions of rocker-arm 38 extending from the uppermost dotted line position y, downwardly, the movement being fanwise from the anchored end 38a. By the time jack plunger 24—2 and rocker-arm end 38b reach their lowermost positions, valve plunger 27—1 will have been lowered just enough to replace it in its neutral position closing both supply port 28a and return port 28b.

Valve plunger 27—1 of control valve 27, it should be noted, is in its neutral position for any set running condition of the engine. It is only at such times as there is a change in engine operation, e. g. when throttling to increase or decrease speed, or when there is a sudden change in load, that such valve plunger 27—1 raises or lowers above or below its neutral position, as the case may be.

In order to insure against the intake of too much fuel mixture by the respective cylinders at such times as the crankshaft 10 is being lowered and the respective cylinder compression chambers 19—1 are thereby being increased in size, an arrangement is provided for automatically closing the intake manifold 25 against cylinder intake during the lowering period.

As illustrated in Fig. 1, a butterfly valve 45 is positioned in intake manifold 25 between carburetor 30 and cylinder head 16, and is adapted to be manipulated by arm 46 for opening and closing the flow passage through the intake manifold.

Force tending to close butterfly valve 45 is exerted by means of a spring 47, which has one of its ends secured to arm 46. The other end of spring 47 is secured to a link 48, which is pivotally connected to a rocker-arm 49. The rocker-arm 49 is fulcrumed intermediate its ends on a shaft 50, which is rigidly secured to a stationary frame member 50—1 of the engine. A link 51 articulatively connects rocker-arm 49 with link 40, and, thereby, with the outer extremity of actuating arm 14d of cradle 14.

When plunger 24—2 of hydraulic jack 24 is in normal lowered position, because there is no suction effect operative in suction chamber 35—1 of vacuum-responsive device 35, the action of the link and rocker-arm arrangement 48, 49 and 51 is to relax spring 47.

A vacuum-responsive device 52, having a suction chamber 52—1 communicating with the intake manifold 25 at a location between butterfly valve 45 and cylinder head 16, and having a diaphragm 52—2 connected to arm 46 of butterfly valve 45 by means of stem 53, is operative under conditions of vacuum in the portion of intake manifold 25 with which it communicates, to exert a force on butterfly valve 45 in opposition to the closing force exerted by spring 47, and effective to open such butterfly valve 45 regardless of spring 47.

Considering now the operation of the above-described arrangement for automatically closing the intake manifold 25 against the over-supply of fuel mixture to the respective cylinders of the engine: when the engine is dead, that is, not operating, jack plunger 24—2 is in lowered position and spring 47 is completely relaxed. Vacuum-responsive device 52 is dormant, and butterfly valve 45 is relaxed.

After the engine has been started, and is idling with butterfly throttle valve 31 partially open, there is a partial vacuum condition within intake manifold 25, the strength of which depends upon the degree of opening of the butterfly throttle valve. This partial vacuum causes vacuum-responsive device 35 to lower floating rocker-arm 38 against the pull of spring 41, and thereby, lowers control valve plunger 27—1, uncovering supply port 28a to cause jack plunger 24—2 to gradually rise, as explained hereinbefore. It is here assumed that the strength of the vacuum in intake manifold is such as to cause jack plunger 24—2 to be completely raised.

Spring 47, it should be noted, is now tensioned because of the raised position of jack plunger 24—2, but its normal closing action on butterfly valve 45 is counteracted by vacuum-responsive device 52, which, due to the vacuum condition within intake manifold 25, is effective to hold butterfly valve 45 in opened position during the entire period of gradual tensioning of spring 47.

Now, assuming that butterfly throttle valve 31 is suddenly opened wide for the purpose of accelerating the engine to high speed. The partial vacuum in intake manifold 25 is immediately dissipated, with a resulting lowering of jack plunger 24—2, and therewith, cradle 14 and crankshaft 10, in the manner previously described. This lowering of the jack plunger, the cradle, and the crankshaft is not, however, accomplished suddenly, since a certain time interval is required for the lifting-oil within the lifting chamber 24—1 of the jack, to run back into the crankcase 20. During this time interval, the spring 47 is gradually relaxed.

Since there is no longer an effective vacuum condition within intake manifold 25 when butterfly throttle valve 31 is suddenly opened, vacuum-responsive device 52 becomes ineffective to counteract the closing action of spring 47 exerted on butterfly valve 45, even though the tension of spring 47 is gradually relaxing. The butterfly valve 45 is thus closed by spring 47.

But the closing of butterfly valve 45 insures the presence of a vacuum condition within that portion of intake manifold 25 which lies between butterfly valve 45 and cylinder head 16, thereby making vacuum-responsive device 52 effective to counteract the diminishing tension of spring 47 and to open butterfly valve 45.

It might be said that there is a "hovering"

action of butterfly valve 45 within the intake manifold during lowering of the jack plunger, the cradle, and the crankshaft, the hovering action being due to the respective opposing forces exerted by spring 47 and vacuum-responsive device 52.

Upon complete lowering of the jack plunger, the crade and the crankshaft, the spring 47 being then completely relaxed, butterfly valve 45 remains in open position. This is normal running condition, a condition in which there are no partial vacuums in the compression chambers 19—1 of the respective cylinders 19 to be compensated for.

Closing of the butterfly throttle valve 31 renews the vacuum condition in intake manifold 25 and raises the jack plunger, cradle, and crankshaft, all as explained hereinbefore.

It should be noted that the arrangement for automatically closing the intake manifold 25 against over-supply of fuel mixture to the respective cylinders of the engine during the lowering of the crankshaft, also effectively guards against full supply of fuel mixture to the respective cylinders should the crankshaft, the cradle, or the hydraulic jack become stuck and locked in raised position when the butterfly throttle valve 31 is wide open.

Since the crankshaft is raised bodily, a flexible connection must be provided from the drive end of the crankshaft to the driven shaft or other driven element.

An advantageous form of flexible connection is illustrated in Figs. 2 and 3. The crankshaft 10 has its drive end 10b protruding from the crankcase 20 through an aperture 60 of ample size to permit full freedom of movement for the crankshaft. A flexible splash guard 61 closes aperture 60 against splashing or outflow of oil therethrough, without interfering with movement of the crankshaft.

The protruding end 10b of crankshaft 10 has a universal 62 fitting over and rigidly secured thereto, while the driven shaft 63 has a similar universal 64 fitting over and rigidly secured to its driven end, as illustrated. The two universals are articulatively joined by the connecting link 65, so that universal 62 can be raised and lowered relative to fixed universal 64 in accordance with the movements of crankshaft 10.

It should be noted that in the diagrammatic representation of Fig. 1, the several control mechanisms are not illustrated in their relative proportions. For the sake of clarity of explanation, control valve 27 is considerably enlarged, as are also, vacuum-responsive devices 35 and 52.

It is advantageous that all the control instrumentalities relating to the raising of the crankshaft be disposed within the crankcase of the engine. In this way, space is conserved, and the various instrumentalities are well protected from damage.

The control feature associated with the intake manifold 25, namely, butterfly valve 45 and its associated mechanism, provides an effective control of fuel intake for any cylinder and piston type of internal combustion engine having high compression characteristics. However, this control feature forms the subject matter of a divisional application Serial No. 745,980, filed May 5, 1947.

Whereas this invention is illustrated and described with respect to only one preferred embodiment thereof, it should be understood that various changes may be made in said embodiment and various other advantageous embodiments may be constructed by those skilled in the art without departing from the spirit and generic purview of the invention as set forth herein and in the claims which here follow.

We claim:

1. In a cylinder and piston type of internal combustion engine having a crankshaft and an intake manifold; a mounting for said crankshaft, said mounting being arranged to raise said crankshaft upwardly toward the cylinder head of the engine, and to lower said crankshaft to its original position; a fluid jack adapted to actuate said mounting to raise said crankshaft; means operatively connecting said fluid jack with said mounting; a system for supplying fluid to and for discharging fluid from said fluid jack; a control valve arranged in said system for controlling the supply and discharge of fluid to and from said fluid jack; a vacuum-responsive device operative from the intake manifold of the engine to control the movement of said control valve; an auxiliary valve in said intake manifold for opening and closing the passage therethrough; a vacuum-responsive device communicating with that portion of said intake manifold which is between said auxiliary valve and the cylinder or cylinders of the engine, and connected to said auxiliary valve for exerting opening action thereon under conditions of vacuum within said portion of the intake manifold; a spring connected at one of its ends to said auxiliary valve; and articulative means connecting the opposite end of said spring to the said fluid jack in such manner that when the said fluid jack is raised the said spring is tensioned, and when lowered the spring is relaxed, the said spring being normally operative, when tensioned, to close the said auxiliary valve, but being ineffective thereon against the said opening action exerted by said vacuum-responsive device.

2. In a cylinder and piston type of internal combustion engine having a crankshaft, an intake manifold, and a crankcase; a mounting for said crankshaft, said mounting being arranged to raise said crankshaft upwardly toward the cylinder head of the engine, and to lower said crankshaft to its original position; a hydraulic jack adapted to actuate said mounting to raise said crankshaft; means operatively connecting said hydraulic jack with said mounting; a plunger valve, said plunger valve communicating with the said crankcase of the engine; a closed conduit circuit leading from said plunger valve at an upper point thereof and returning to said plunger valve at a lower point thereof; the plunger of said plunger valve being adapted in its neutral position to close both ends of said conduit circuit, in its raised position to close the upper end of said circuit, and in its lowered position to close the lower end of said circuit; a shunt conduit leading from said conduit circuit to said jack; a pump disposed in said conduit circuit between the said upper end thereof and said shunt conduit; a check valve disposed in said conduit circuit between said pump and said shunt conduit; a vacuum-responsive device operative from the intake manifold of the engine; articulate connecting means between the plunger of said plunger valve, the said vacuum-responsive device, and the said hydraulic jack, whereby response of said vacuum-responsive device to a vacuum condition within said intake manifold will lower the plunger of said plunger valve, thereby opening the said upper end of said conduit circuit and closing the said lower end thereof, whereby oil from said crankcase is allowed to flow into said jack for actuating the said mounting and for raising the said crankshaft; and means for raising the plunger of said plunger valve to close the said upper end of said conduit circuit and to open the said lower end thereof, thereby allowing oil from said hydraulic jack to drain back into said crankcase.

3. The combination recited in claim 2, wherein the said articulate connecting means comprises a floating rocker-arm pivotally connected at one of its ends to said hydraulic jack, pivotally connected at its opposite end to said vacuum-responsive device, and pivotally connected intermediate its said ends to the said plunger of said plunger valve, and wherein the said plunger of said plunger valve is so arranged as to close both of said ends of said conduit circuit at such times as the said hydraulic jack is either substantially completely raised or substantially completely lowered.

4. In a compression type of internal combustion engine having an intake manifold for fuel and a throttle valve, the combination of means for automatically varying the volumetric compression ratio of said engine from time to time, during operation thereof, in accordance with variations in pressure within the said intake manifold, so as to maintain the desired compression ratio substantially constant; a normally open valve disposed within said intake manifold between said throttle valve and the engine and arranged to substantially close the passage through said intake manifold; means for closing said valve while the said volumetric compression ratio is being increased; and means operable by vacuum conditions within that part of said intake manifold which lies between said valve and said engine, for opening said valve against the action of said closing means.

5. In a compression type of internal combustion engine having an intake manifold for fuel, the combination of movable means for varying the volumetric compression ratio of the engine so as to maintain the desired compression ratio substantially constant; suction-operable means for actuating said movable means, said suction-operable means being connected with the intake manifold so as to operate by reason of vacuum conditions existing therein; a normally open valve disposed within the intake manifold between the engine and the connection of said suction-operable means, said valve being arranged to open and close the passage through the intake manifold; suction-operable means for opening said valve and for maintaining it open, said second named suction-operable means being connected to the intake manifold between the engine and said valve so as to operate by reason of vacuum conditions existing within that portion of the intake manifold; and tensionable resilient means connecting the first-named suction-operable means with said valve, said first-named suction-operable means being effective, when actuated, to tension said resilient means, and said resilient means being effective, when tensioned, to close said valve, providing the second-named suction-operable means is not operative to hold said valve open.

6. In a compression type of internal combustion engine having an intake manifold for fuel, the combination of movable means for varying the volumetric compression ratio of the engine so as to maintain the design compression ratio substantially constant; a fluid jack having a plunger adapted to move the said movable means for the purpose specified; a reservoir for fluid; a system for conducting fluid from said reservoir to said fluid jack and for returning fluid to said reservoir from said fluid jack; a control valve communicating with said reservoir and associated with said fluid conducting and return system for controlling the flow of fluid to and from said fluid jack, said control valve having a movable valve member; a vacuum-responsive device communicating with the intake manifold of said engine and having an element adapted to be displaced by the existence of vacuum conditions within said intake manifold; and a rigid element to which the plunger of said fluid jack, the movable valve member of said control valve, and the displaceable element of said vacuum-responsive device are pivotally connected, so that said control valve is automatically set from time to time in accordance with the requirements of said engine during the operation thereof.

7. In a compression type of internal combustion engine having an intake manifold for fuel, the combination of movable means for varying the volumetric compression ratio of the engine so as to maintain the desired compression ratio substantially constant; a fluid jack having a plunger adapted to move said movable means for the purpose specified, raising of the jack plunger being operative to reduce the volumetric compression ratio, and lowering thereof being operative to return the volumetric compression ratio to normal; a reservoir for fluid; a system for conducting fluid from said reservoir to said fluid jack and for returning fluid to said reservoir from said fluid jack; a plunger valve communicating with said reservoir and interposed in said fluid conducting and return system for controlling the flow of fluid to and from said fluid jack; a vacuum-responsive device communicating with the intake manifold of said engine and having an element adapted to be lowered by the existence of vacuum conditions within said intake manifold, and means for returning said element to its normal position when there are no longer vacuum conditions within said intake manifold; a floating, rigid, rocker arm pivotally connected at its opposite end to said element of the vacuum-responsive device, and pivotally connected intermediate its said ends to the plunger of said plunger valve, said plunger being so arranged as to close said valve to passage of fluid in either direction at such times as said jack plunger is substantially completely raised and substantially completely lowered.

JOHN MELVIN WOODRUFF.
JESSE ALVIN WOODRUFF.

REFERENCES CITED

The following references are of record in the file of this patent:

UNITED STATES PATENTS

| Number | Name | Date |
|---|---|---|
| Re. 18,595 | Wilson | Sept. 13, 1932 |
| 2,120,012 | Andreau | June 7, 1938 |
| 1,404,366 | Halton | Jan. 24, 1922 |
| 1,566,376 | Couty | Dec. 22, 1925 |
| 1,684,550 | Mallory | Sept. 18, 1928 |

FOREIGN PATENTS

| Number | Country | Date |
|---|---|---|
| 751,217 | France | Aug. 29, 1933 |
| 272,863 | England | Oct. 27, 1927 |